US011105420B2

(12) United States Patent
Jeong (10) Patent No.: US 11,105,420 B2
(45) Date of Patent: Aug. 31, 2021

(54) ANTI-THEFT APPARATUS OF SHIFT LEVER FOR VEHICLE

(71) Applicants: HYUNDAI MOTOR COMPANY, Seoul (KR); KIA MOTORS CORPORATION, Seoul (KR)

(72) Inventor: Won Jin Jeong, Hwaseong-Si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 372 days.

(21) Appl. No.: 16/157,834

(22) Filed: Oct. 11, 2018

(65) Prior Publication Data
US 2019/0316676 A1   Oct. 17, 2019

(30) Foreign Application Priority Data

Apr. 12, 2018   (KR) ..................... 10-2018-0042843

(51) Int. Cl.
| | |
|---|---|
| *F16H 61/22* | (2006.01) |
| *B60R 25/00* | (2013.01) |
| *F16H 61/36* | (2006.01) |
| *F16H 59/10* | (2006.01) |
| *F16H 59/02* | (2006.01) |

(52) U.S. Cl.
CPC ........... *F16H 61/22* (2013.01); *B60R 25/007* (2013.01); *F16H 59/10* (2013.01); *F16H 61/36* (2013.01); *F16H 2059/026* (2013.01)

(58) Field of Classification Search
CPC .......... F16H 61/22; F16H 61/36; F16H 59/10; F16H 2059/026; B60R 25/007; B60R 25/066

USPC .............................................. 74/502.4, 502.6
See application file for complete search history.

(56) References Cited

U.S. PATENT DOCUMENTS

| | | | | |
|---|---|---|---|---|
| 4,418,583 A | * | 12/1983 | Taig ....................... | F16C 1/105 192/111.11 |
| 5,662,004 A | * | 9/1997 | Osborn ................... | F16H 59/10 74/502.4 |
| 5,682,797 A | * | 11/1997 | Kelley .................... | F16C 1/226 403/11 |
| 5,785,626 A | * | 7/1998 | Osborn ................... | F16H 59/10 192/44 |
| 6,019,014 A | * | 2/2000 | Jenkins ................... | F16C 1/105 74/502.4 |

(Continued)

FOREIGN PATENT DOCUMENTS

KR   10-1997-0039977 A   7/1997

*Primary Examiner* — Victor L Macarthur
(74) *Attorney, Agent, or Firm* — Morgan, Lewis & Bockius LLP (57) ABSTRACT

An anti-theft apparatus of a shift lever for a vehicle includes: a shift lever case having a shift lever which is connected with a shift cable and a mounting portion fixing a socket of the shift cable; and a mounting bracket which is detachably connected to the mounting portion to cover the mounting portion when the mounting bracket is mounted to the mounting portion, wherein the mounting bracket includes: a first end portion having a penetration hole through which the shift cable passes when the mounting bracket is mounted to the mounting portion; and a second end portion having an insert groove into which a part of the socket is inserted and in which fixing pins wrap the shift cable to limit a lateral movement of the shift cable.

12 Claims, 11 Drawing Sheets

(56) References Cited

U.S. PATENT DOCUMENTS

| | | | |
|---|---|---|---|
| 6,102,609 A * | 8/2000 | Tsuge | F16C 1/101 |
| | | | 403/301 |
| 6,105,458 A * | 8/2000 | Casas Gomila | F16C 1/105 |
| | | | 74/502.4 |
| 6,896,438 B1 * | 5/2005 | Chen | B62K 19/36 |
| | | | 403/290 |
| D697,153 S * | 1/2014 | Fossum | D21/753 |
| 2004/0105720 A1 * | 6/2004 | Ishikawa | F16C 1/265 |
| | | | 403/122 |
| 2004/0129105 A1 * | 7/2004 | Gordy | F16C 1/105 |
| | | | 74/502.4 |
| 2006/0236804 A1 * | 10/2006 | Ruhlander | F16C 1/105 |
| | | | 74/502.2 |
| 2006/0236806 A1 * | 10/2006 | Ruhlander | F16C 1/262 |
| | | | 74/502.6 |
| 2014/0326836 A1 * | 11/2014 | Kim | F16C 1/262 |
| | | | 248/65 |
| 2018/0119724 A1 * | 5/2018 | Hundsdorfer | F16C 1/105 |

* cited by examiner

ANTI-THEFT APPARATUS OF SHIFT LEVER FOR VEHICLE

CROSS REFERENCE TO RELATED APPLICATION

The present application claims priority of Korean Patent Application No. 10-2018-0042843 filed on Apr. 12, 2018, the entire contents of which is incorporated herein for all purposes by this reference.

TECHNICAL FIELD

The present disclosure relates to an anti-theft apparatus of a shift lever for a vehicle to prevent theft of the vehicle.

BACKGROUND

In recent years, an apparatus for preventing theft of a vehicle has been introduced to a vehicle. Such an anti-theft apparatus has been used for restricting operation of a steering wheel, restricting transmission operation, restricting a braking device, and the like. However, most of the anti-theft apparatuses had a problem in that the structure is complicated and the cost is increased because electronic control and a controller for determining whether the ignition is off or not should be applied thereto.

On the other hand, since the vehicle may be stolen by forcibly moving the vehicle, the shift stage thereof should be maintained at the P-stage. However, even if the current shift stage is parked at the P-stage, there is a problem that the vehicle may be moved as a thief enters the vehicle interior, detaches the console, and forcibly operates the cable connected to the shift lever to release the P-stage.

As described above, even if the shift lever is positioned at the P-stage, the shift stage can be shifted to the N-stage in a simple manner through the console, which causes a big problem of theft.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an anti-theft apparatus of a shift lever for a vehicle that prevents a vehicle from being stolen by preventing a cable connected to a shift lever from being forcibly operated through a console.

According to one aspect, an anti-theft apparatus of a shift lever for a vehicle may include: a shift lever case having a shift lever which is connected with a shift cable and a mounting portion fixing a socket of the shift cable; and a mounting bracket which is detachably connected to the mounting portion to cover an inner part of the mounting portion when the mounting bracket is mounted to the mounting portion, wherein the mounting bracket includes a first end portion having a penetration hole through which the shift cable passes when the mounting bracket is mounted to the mounting portion and a second end portion having an insert groove into which a part of the socket is inserted and in which fixing pins wrap the shift cable to limit a lateral movement of the shift cable.

The mounting bracket may include the first end portion of which a lower end portion is sunken to an upper side to form the penetration hole through which the shift cable passes; the second end portion of which a lower end portion is sunken to form the insert groove into which the part of the socket of the shift cable is inserted; a side portion connecting both end portions of the first end portion and the second end portion; and an upper end portion closing an upper side, so that the lower end portion of the mounting bracket is opened to form a box shape.

The penetration hole of the mounting bracket may be formed larger than the diameter of the shift cable; and the height of the penetration hole may be longer than the height at which the shift cable is moved in the up-down direction when the shift lever is moved to the forefront or the rearmost.

A sunken engaging portion may be formed in the mounting portion so that the socket of the shift cable can be seated; and the socket of shift cable may include a body portion having a support portion which the engaging portion is inserted into and coupled with when seated in the mounting portion; and an extension portion extending from the body portion to one side and inserted into the insert groove of the mounting bracket.

The fixing pins may extend from the inside of an upper surface to a lower side of the mounting bracket and composed of a plurality of numbers spaced from each other, so that the shift cable may be disposed in the separated space between the fixing pins.

The mounting portion may be formed with a plurality of fixing holes into which the plurality of fixing pins are inserted; and the fixing holes may be arranged at both sides of the shift cable with the socket of the shift cable fixed to the mounting portion.

The spacing distance between the fixing pins and the spacing distance between the fixing holes may be formed to be the same; and the spacing distances of the fixing pins and the fixing holes may be larger than the diameter of the shift cable.

Hanging portions of hook or groove shape may be formed on both sides of the mounting bracket and corresponding portions of hook or groove shape corresponding to the hanging portions of the mounting bracket may be formed in the mounting portion, so that the mounting bracket is fixed at the mounting portion by the hanging portions and the corresponding portions engaged with each other when the mounting bracket is mounted on the mounting portion.

The hanging portions may be formed of a hook shape at both sides of the mounting bracket; and the corresponding portions may be formed of a groove shape at the mounting portion, which extend to the both sides of the mounting bracket and the hook of the hanging portions may be inserted therein.

The hanging portions may be formed of a groove shape sunken at both sides of the mounting bracket; and the corresponding portions may be formed of a hook shape extending upwardly from the mounting portion and inserted into and engaged with the hanging portions of the groove shape when the mounting bracket is mounted on the mounting portion.

The second end of the mounting bracket may be formed with a removal hole extended upwardly from the insert groove and opened to the hanging portions and the corresponding portions, so that the hanging portions and the corresponding portions are exposed to the outside of the mounting bracket.

The lever plate to which the shift lever and the shift cable are connected may be rotatably installed in the shift lever case;

an opened hole communicated to the lever plate may be formed on the outer side of the shift lever case; and the opened hole may be positioned to engage with the lever plate with the shift lever positioned at the neutral stage so that the position of the shift lever can be fixed to the neutral stage when the fixing pins of the mounting bracket are inserted into the opened hole.

According to the anti-theft apparatus of the shift lever for the vehicle having the above-described structure, the shift cable connected to the shift lever is prevented from being detached from the shift lever, thereby preventing forced operation of the shift cable after detaching the shift cable. As a result, the shift stage of the vehicle is maintained in the parking stage so that the vehicle cannot be forcibly moved, thereby preventing the vehicle from being stolen.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to other component, it may be directly connected or coupled to the other component, but it should be understood that another component may exist between the component and the other component. Contrarily, when a component is referred to as being "directly connected," or "directly coupled" to other component, it should be understood that another component may be absent between the component and the other component. Other expressions describing the relationship between components, that is, "between" and "immediately between," or "adjacent to" and "directly adjacent to" should also be construed as described above.

Terms used herein is used only for the purpose of describing specific embodiments, and are not intended to limit the present disclosure. Unless the context clearly dictates otherwise, the singular form includes the plural form. In this description, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skilled in the art to which the present disclosure pertains. General terms that are defined in a dictionary shall be construed to have meanings that are consistent in the context of the relevant art, and will not be interpreted as having an idealistic or excessively formalistic meaning unless clearly defined in the present disclosure.

Hereinafter, exemplary embodiments of the present disclosure will be described in detail with reference to the accompanying drawings. Like reference numerals denote like members throughout the drawings.

Figure 1:
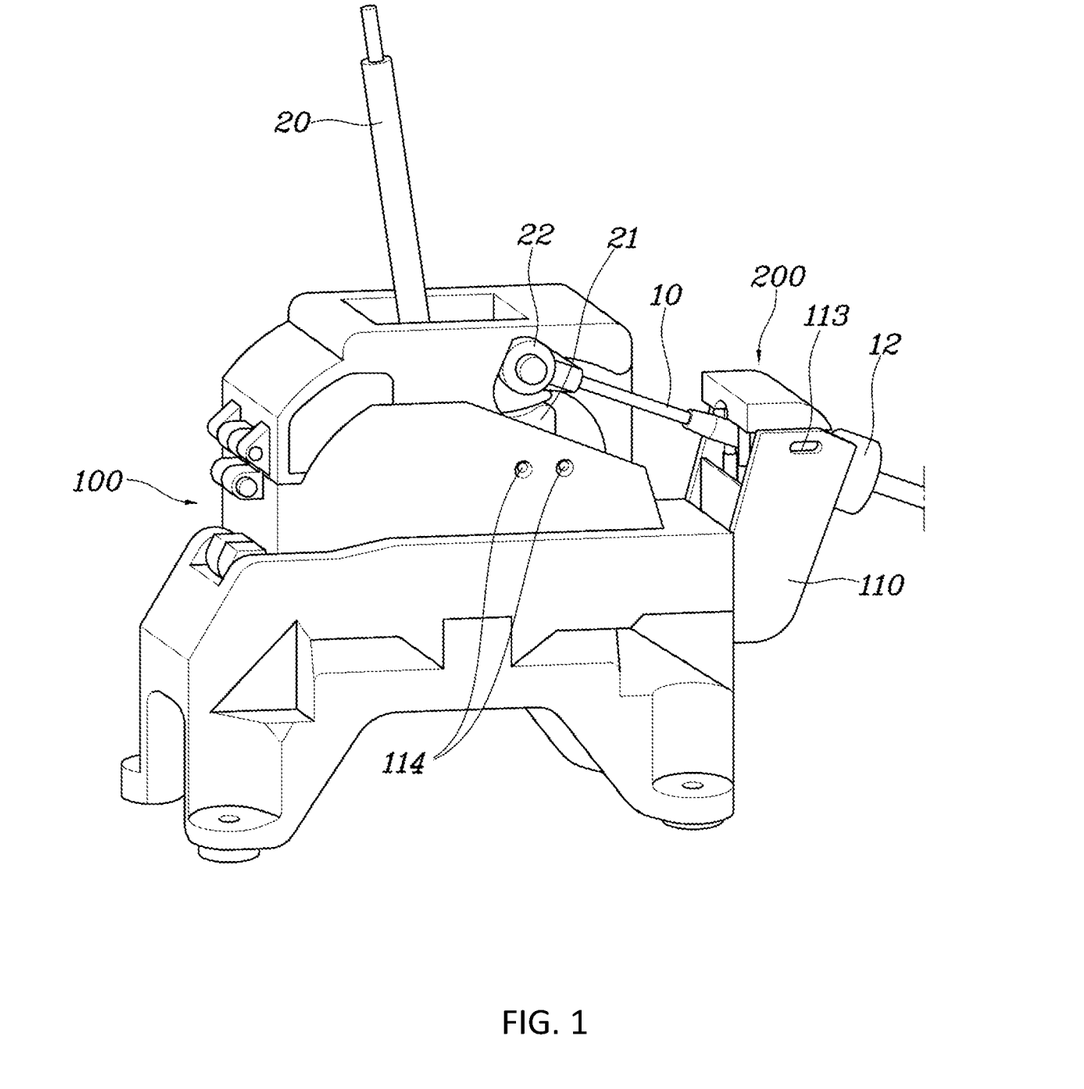
FIG. 1 is a drawing showing an anti-theft apparatus of a shift lever for a vehicle according to an exemplary embodiment of the present disclosure.

FIG. 1 is a drawing showing an anti-theft apparatus of a shift lever for a vehicle according to an exemplary embodiment of the present disclosure, and FIG. 2 to FIG. 11 are drawings explaining the anti-theft apparatus of the shift lever for the vehicle shown in FIG. 1.

Figure 2:
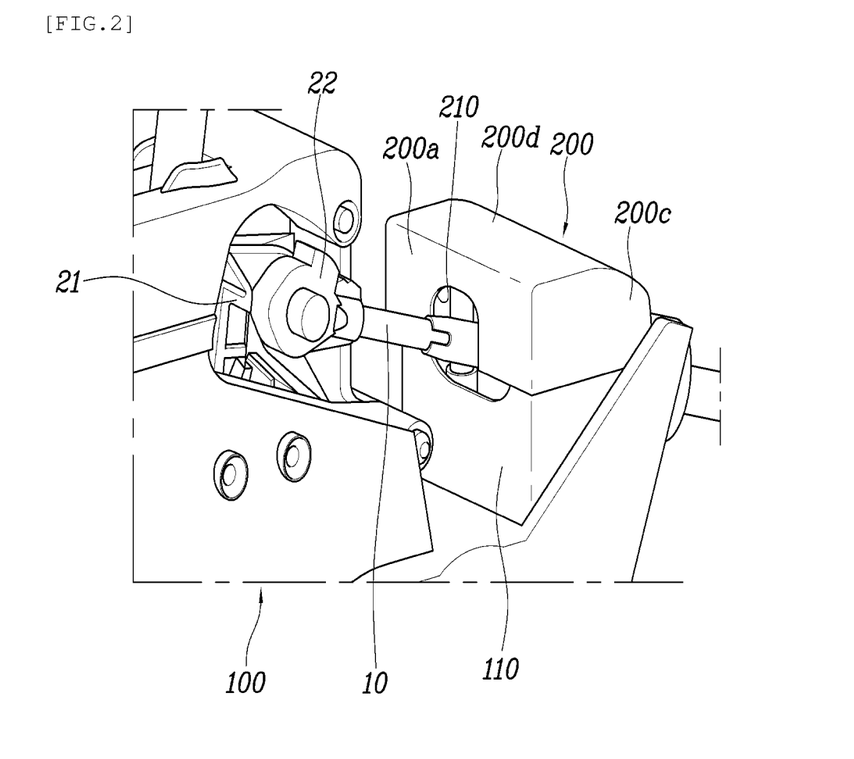
FIGS. 2 to 11 are drawings explaining the anti-theft apparatus of the shift lever for the vehicle shown in FIG. 1.
Figure 3:
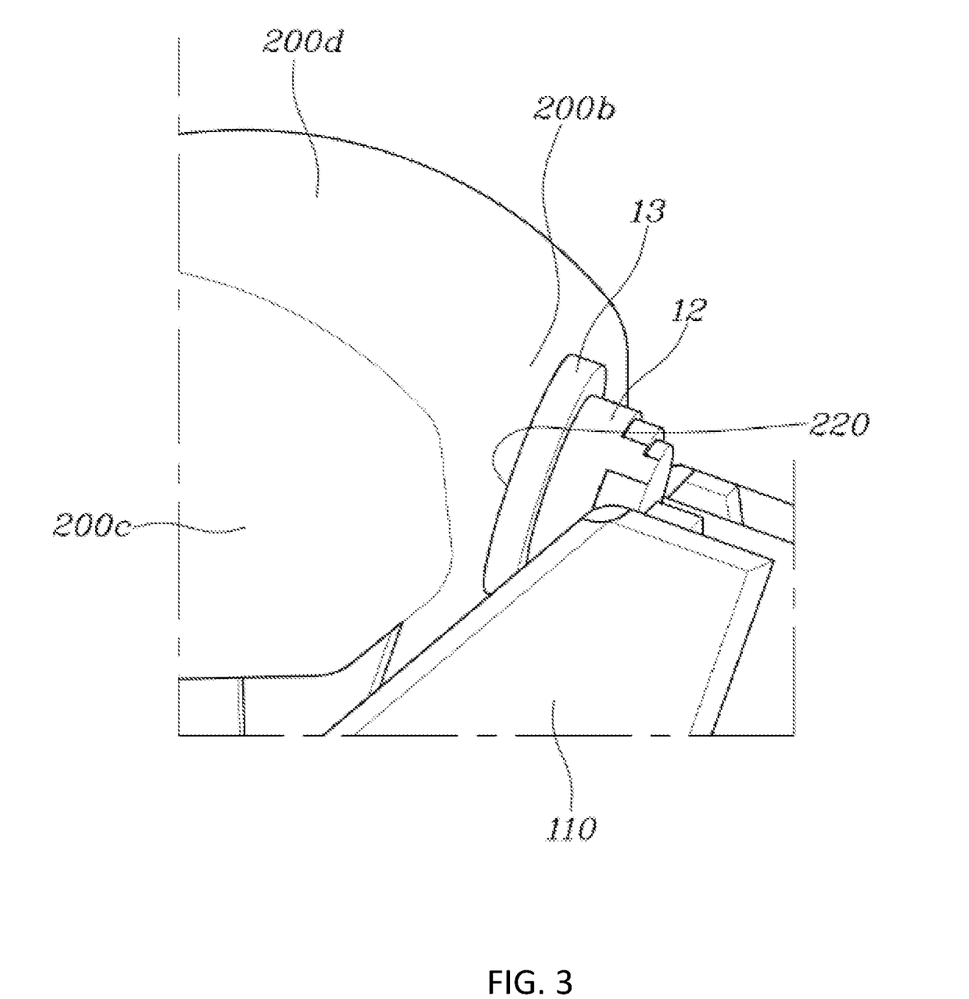

An anti-theft apparatus of a shift lever for a vehicle according to an exemplary embodiment of the present disclosure, as shown in FIG. 1 to FIG. 3, may include a shift lever case 100 in which a shift lever 20 connected with a shift cable 10 is installed and a mounting portion 110 fixing a socket 12 of the shift cable 10 is formed; and a mounting bracket 200 that is detachably installed to the mounting portion 110 and formed to cover an inner part of the mounting portion 110 when mounted to the mounting portion 110, of which a first end portion 200a has a penetration hole 210 through which the shift cable 10 passes when mounted to the mounting portion 110 and a second end portion 200b has an insert groove 220 into which a part of the socket 12 is inserted and in which fixing pins 230 are formed to wrap the shift cable 10 to limit lateral movement of the shift cable 10.

The shift structure of the present disclosure may be applied to a vehicle equipped with an automatic transmission and shifted to P, R, N or D-stage when the shift lever 20 is pivoted in the front-rear direction. Herein, the shift lever 20 may be installed in the shift lever case 100 and a lever plate 21 may be pivoted together with the shift lever 20 so that a sense of operation can be provided through the detent device. The shift cable 10 may be connected with the shift lever 20 so that the operation force by pivoting of the shift lever 20 can be transmitted to the transmission side to perform shifting.

The shift lever case 100 in which the shift lever 20 and the shift cable 10 is provided may be arranged in a console of a vehicle interior, the shift lever 20 may be coupled to the lever plate 21 rotatably installed in the shift lever case 100 and an eye end 22 of the shift cable 10 may be laterally coupled to the lever plate 21. Thus, it is possible to change shift stage using the shift cable 10 connected with the detached eye end 22 after detaching the console in the vehicle interior and then detaching the eye end 22 connected with the lever plate 21. The present disclosure is to solve this problem and the mounting bracket 200 covering the shift cable 10 is mounted at in the mounting portion 110 to which the socket 12 of the shift cable 10 is fixed so that the shift cable 10 cannot be removed from the lever plate 21.

Herein, since the penetration hole 210 through which the shift cable 10 passes is formed in the first end portion 200a of the mounting bracket 200, even if the shift cable 10 moves in the up-down direction when the shift lever 20 is pivoted in the front-rear direction, the up-down directional behavior of the shift cable 10 is not interfered in the penetration hole 210 so that the operation of the shift lever 20 can be smoothly performed.

Furthermore, the insert groove 220 into which a part of the socket 12 of the shift cable 10 is inserted is formed on the second end 200b of the mounting bracket 200. When the mounting bracket 200 is mounted on the mounting portion 110, the socket 12 of the shift cable 10 is inserted into the insert groove 220 of the mounting bracket 200, so that the socket 12 is not detached, thereby preventing the forced operation of the shift cable 10 by the separation of the socket 12 of the shift cable 10.

In addition, the fixing pins 230 are provided in the inside of the mounting bracket 200, so that the lateral movement of the shift cable 10 is limited by the fixing pins 230 covering the shift cable 10 at both sides of the shift cable 10 when the mounting bracket 200 is mounted to the mounting portion 110. Therefore, when detaching the eye end 22 of the shift cable 10 from the lever plate 21 for forcibly operating the shift cable 10, the lateral movement of the shift cable 10 is restricted by the fixing pins 230, so that the operation of separating the shift cable 10 laterally is limited, thereby preventing the operation of detaching the shift cable 10 from the lever plate 21.

Thus, when the mounting bracket 200 is mounted on the mounting portion 110 of the shift lever case 100, detachment of the shift cable 10 from the lever plate 21 is restricted and detachment of the socket 12 of the shift cable 10 from the mounting portion 110 is restricted so that the forced operation of the shift lever 20 can be prevented. As a result, the shift stage of the vehicle can maintain the parking-stage, thereby preventing the vehicle from being stolen by not forcibly moving the vehicle.

Figure 4:
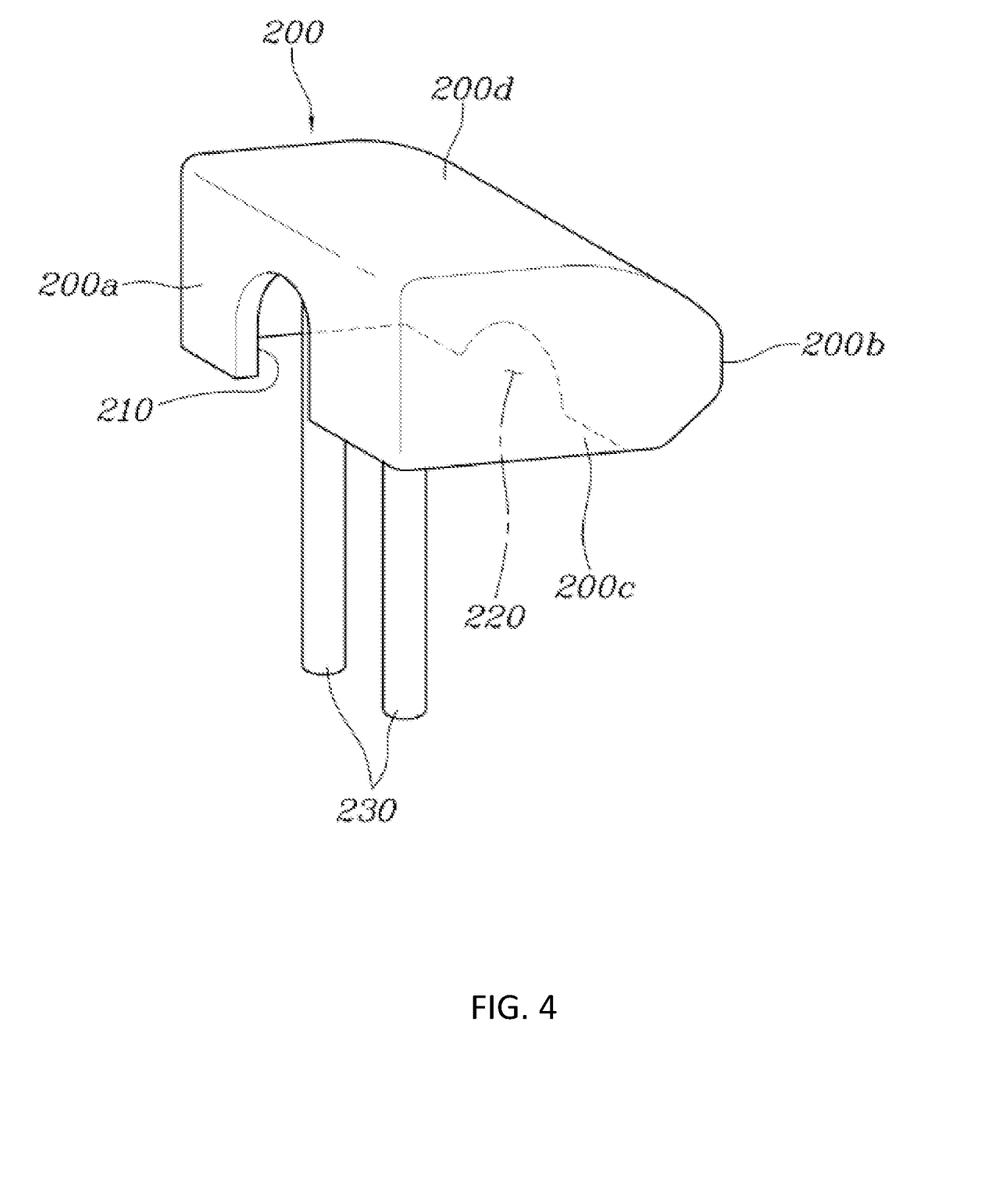

To explain the present disclosure in detail, as shown in FIG. 4, the mounting bracket 200 may include: the first end portion 200a of which a lower end portion is sunken to an upper side to form the penetration hole 210 through which the shift cable 10 passes; the second end portion 200b of which a lower end portion is sunken to form the insert groove 220 into which a part of the socket 12 of the shift cable 10 is inserted; a side portion 200c connecting both end portions of the first end portion 200a and the second end portion 200b; and an upper end portion 200d closing an upper side, so that the lower end portion of the mounting bracket 200 is opened to form a box shape.

In this way, the mounting bracket 200 has a box shape having the lower end portion open so that the fixing pins 230 extending from the upper end portion 200d downward can extend downwardly through the lower end portion. In addition, the penetration hole 210, through which the shift cable 10 is passed, is formed in the first end portion 200a of the mounting bracket 200, so that the shift cable 10 is not interfered with the mounting bracket 200 when the shift cable 10 moves in the up-down direction. The insert groove 220 into which the socket 12 of the shift cable 10 is inserted is formed in the second end 200b so that the socket 12 of the shift cable 10 can be fixed not to be separated between the mounting bracket 200 and the mounting portion 110.

The side portion 200c of the mounting bracket 200 may be provided with fixing means for engaging with the mounting portion 110, which will be described below.

On the other hand, the penetration hole 210 of the mounting bracket 200 may be formed larger than the diameter of the shift cable 10, and the height of the penetration hole 210 may be longer than the height at which the shift cable 10 is moved in the up-down direction when the shift lever 20 is moved to the forefront or the rearmost.

Thus, since the diameter of the penetration hole 210 of the mounting bracket 200 is formed to be larger than the diameter of the shift cable 10, the shift cable 10 is not brought into contact with the penetration hole 210 when the shift cable 10 is moved by the operation of the shift lever 20, thereby preventing the shift cable 10 from being damaged due to contact with the through hole 210 when the shift cable 10 is moved in the up-down direction. In addition, the height of the penetration hole 210 may be longer than the height at which the shift cable 10 is moved in the up-down direction when the shift lever 20 is moved to the forefront or the rearmost direction, so that, even if the shift lever 20 is operated to the forefront to move the shift cable 10 upwardly, the shift cable 10 is not contacted with the penetration hole 210, thereby smoothly performing the shifting operation.

Figure 5:
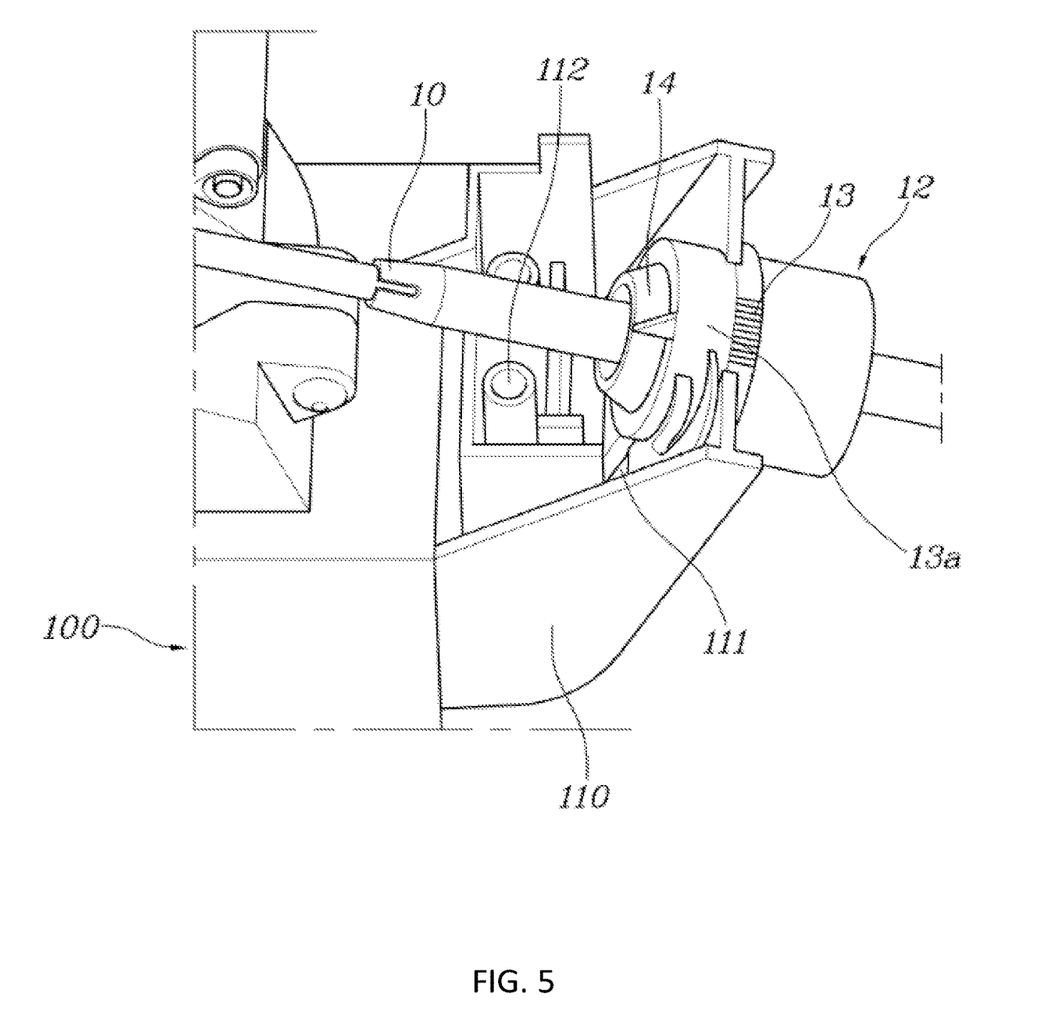

On the other hand, as shown in FIG. 5, a sunken engaging portion 111 may be formed in the mounting portion 110 so that the socket 12 of the shift cable 10 can be seated. The socket 12 of the shift cable 10 may include a body portion 13 formed with a support portion 13a which the engaging portion 111 is inserted into and coupled with when seated in the mounting portion 110 and an extension portion 14 extending from the body portion 13 to one side such that the shift cable 10 penetrates into the extension portion 14.

Thus, the sunken engaging portion 111 is formed in the mounting portion 110 and the socket 12 of the shift cable 10 is mounted on the engaging portion 111 so that the shift cable 10 can be fixed to the mounting portion 110. Herein, the socket 12 of the shift cable 10 is composed of the body portion 13 having the support portion 13a and an extension portion 14 extended from the support portion 13a of the body portion 13 and the engaging portion 111 is inserted into and coupled to the support portion 13a formed at the body portion 13 so that the socket 12 of the shift cable 10 can be fixed to the mounting portion 110. The extension portion 14 is extended from the support portion 13a of the body portion 13 such that the shift cable 10 penetrates into the extension portion 14.

That is, the extension portion 14 is fixed by the mounting bracket 200 while the body portion 13 the socket 12 of the shift cable 10 is seated on the engaging portion 111 of the mounting portion 110 so that disassembly of the shift cable 10 is not possible as long as the mounting bracket 200 is not detached from the mounting portion 110. Therefore, it is possible to prevent theft by separating the socket 12 of the shift cable 10 to operate the shift cable 10.

On the other hand, as shown in FIG. 4 and FIG. 5, the fixing pins 230 may be formed to extend from the inside of an upper surface to the lower side of the mounting bracket 200 and composed of a plurality of numbers spaced from each other so that the shift cable 10 may be disposed in the separated space between the fixing pins 230. The support portion 13a is partially inserted in the insert groove 220 of the mounting bracket 200, thereby preventing the socket 12 from being released from the mounting bracket 200 without detaching the mounting bracket 200 from the mounting portion 110 of the shift lever case 100.

The mounting portion 110 may be formed with a plurality of fixing holes 112 into which the plurality of fixing pins 230 are inserted. The fixing holes 112 may be arranged at both sides of the shift cable 10 with the socket 12 of the shift cable 10 fixed to the mounting portion 110.

Therefore, the fixing pins 230 are extended from the inside of the upper surface to the lower side of the box-shaped mounting bracket 200 and composed of a plurality of numbers spaced form each other so that the lateral movement of the shift cable 10 can be limited by being inserted into the space between the fixing pins 230. The fixing pins 230 are inserted into the fixing holes 112 formed at the mounting portion 110 when the mounting bracket 200 is mounted at the mounting portion 110, so that the position of the mounting bracket 200 is fixed in the mounting portion 110 and the shift cable 10 arranged between the fixing pins 230 are allowed to move only in the up-down direction and are prevented from being separated between the fixing pins 230.

The spacing distance between the fixing pins 230 and the spacing distance between the fixing holes 112 are formed to be the same so that a plurality of fixing pins 230 can be matched and inserted into a plurality of the fixing holes 112 when the mounting bracket 200 is mounted on the mounting portion 110. The spacing distances of the fixing pins 230 and the fixing holes 112 are larger than the diameter of the shift cable 10 so that damage to the shift cable 10 due to continuous contact with the fixing pin 230 during the shift cable 10 moves in the up-down direction can be prevented.

On the other hand, hanging portions 240 of hook or groove shape may be formed on both sides of the mounting bracket 200 and corresponding portions 113 of hook or groove shape corresponding to the hanging portions 240 of the mounting bracket 200 may be formed in the mounting portion 110 so that the mounting bracket 200 can be fixed at the mounting portion 110 by the hanging portions 240 and the corresponding portions 113 engaged with each other when the mounting bracket 200 is mounted on the mounting portion 110.

That is, since the mounting bracket 200 and the mounting portion 110 can be engaged with each other through hook hanging structure. The corresponding portions 113 of the mounting portion 110 are configured with the groove shape when the hanging portions 240 of the mounting bracket 200 are configured with the hook shape so that the mounting bracket 200 and the mounting portion 110 can be engaged with each other to be fixed.

The hanging portions 240 of the mounting bracket 200 and the corresponding portions 113 of the mounting portion 110 may be formed of a plurality of exemplary embodiments as follows.

Figure 6:
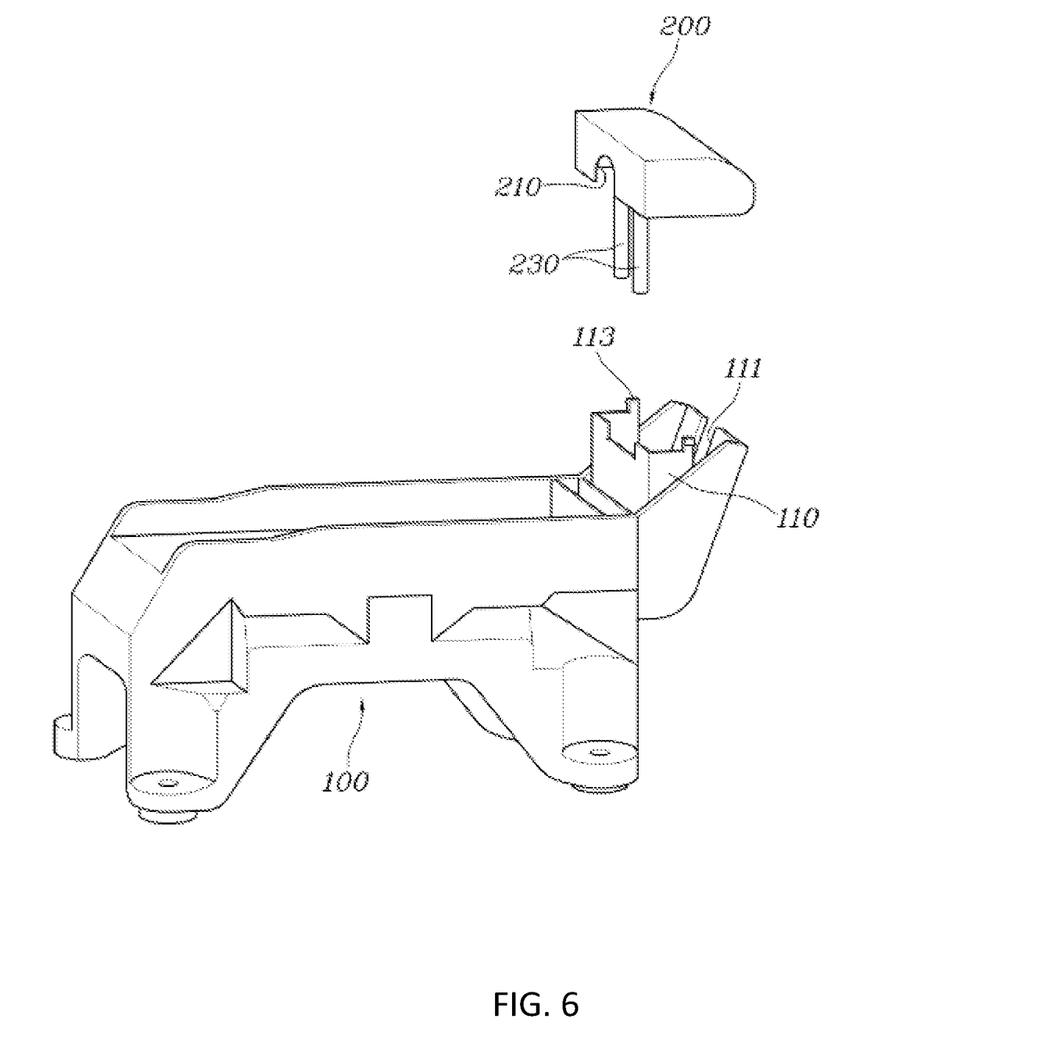
Figure 7:
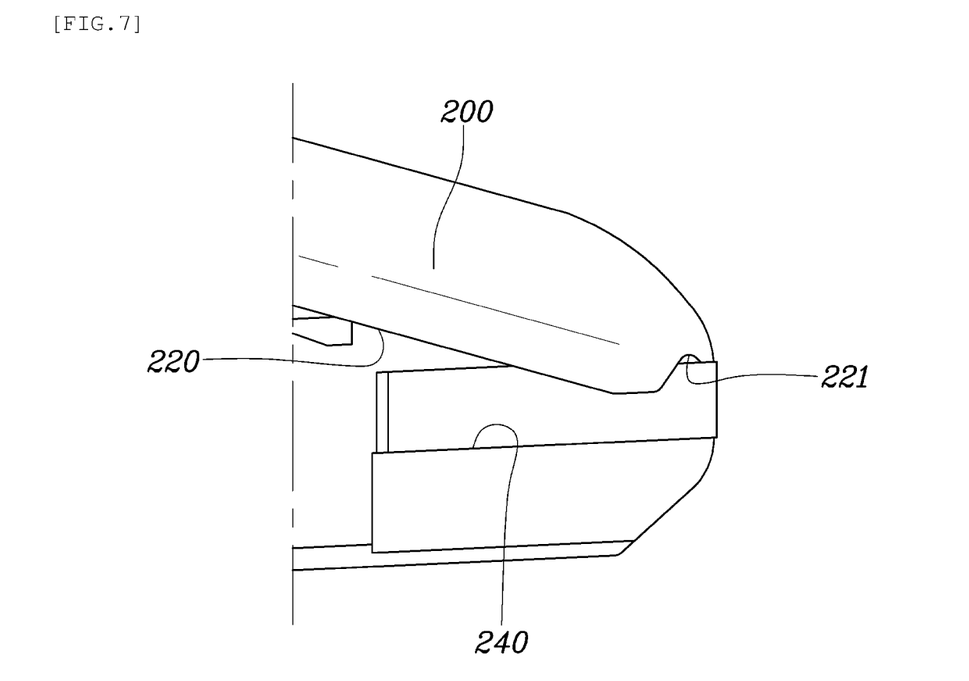

As shown FIGS. 6 to 7, the hanging portions 240 may be formed of a hook shape at both sides of the mounting bracket 200 and the corresponding portions 113 may be formed of a groove shape at the mounting portion 110, which extend to the both sides of the mounting bracket 200 and the hook of the hanging portions 240 is inserted therein.

Herein, the matching position of the hanging portions 240 of the mounting bracket 200 and the corresponding portion 113 of the mounting portion 110 can be set to a position where the fixing pins 230 described above are inserted into the fixing holes 112.

Further, in a case of the hanging portions 240, as shown is FIG. 6, the hook is extended downward from the lower end portions of the both sides of the mounting bracket 200 and formed at the extended end portions thereof so that the hanging portions 240 can be deformable to be easily inserted into the groove of the corresponding portions 113.

Figure 8:
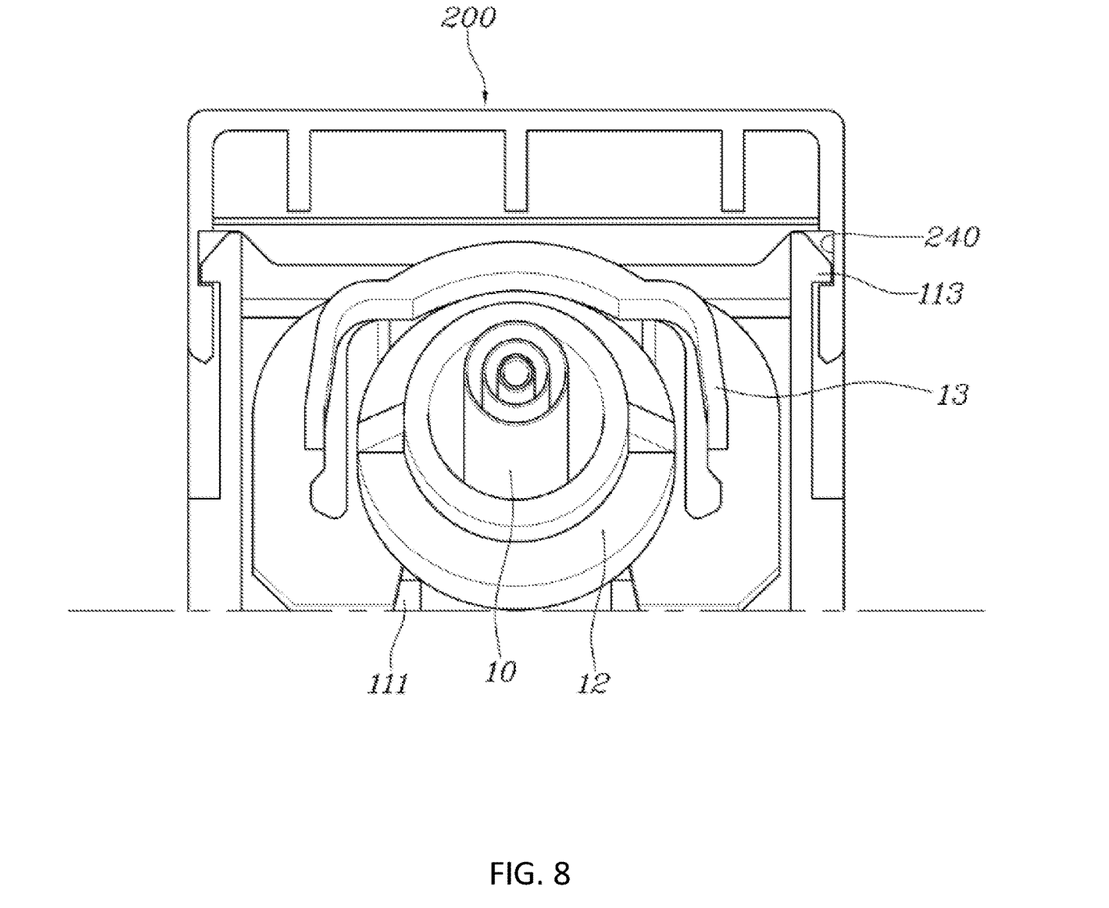
Figure 9:
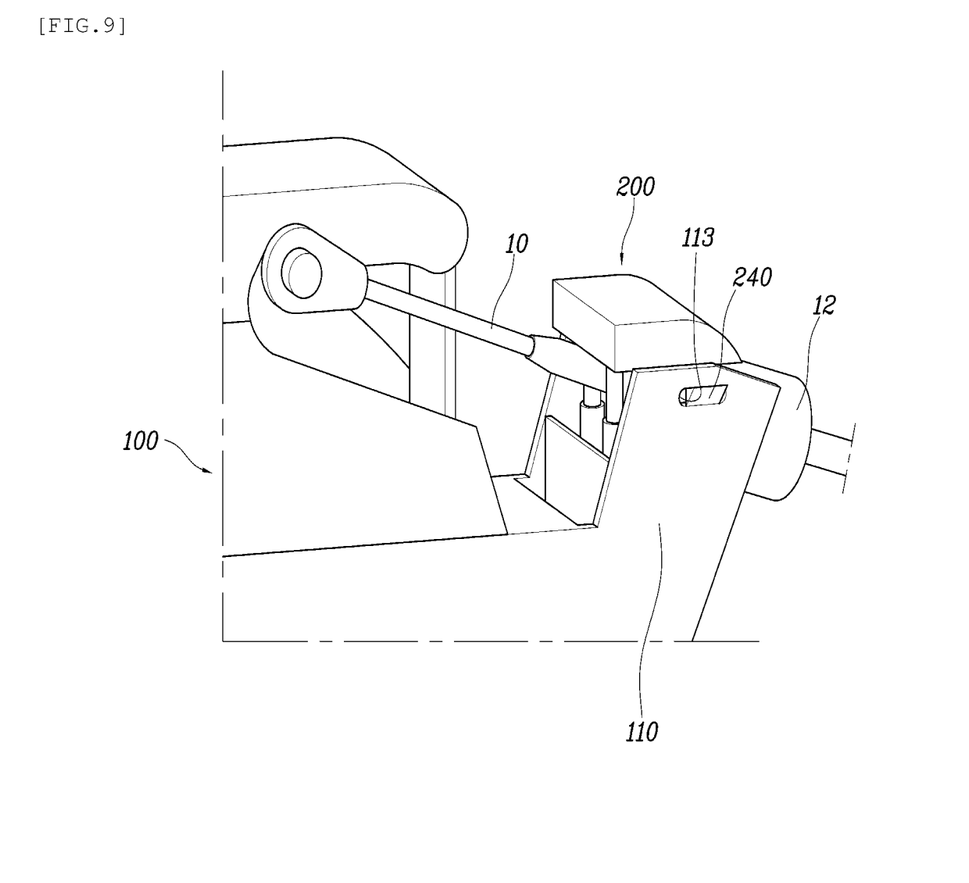
Figure 10:
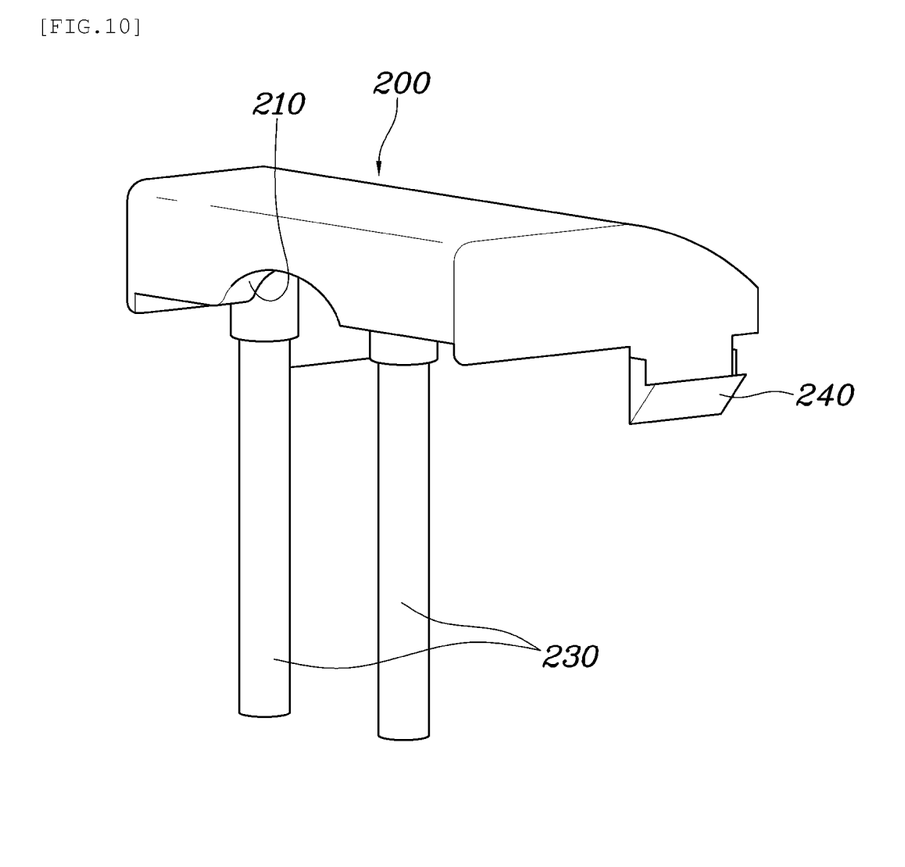

On the other hand, as shown in FIGS. 8 to 10, the hanging portions 240 may be formed of a groove shape sunken at both sides of the mounting bracket 200 and the corresponding portions 113 may be formed of a hook shape extending upwardly from the mounting portion 110 and inserted into and engaged with the hanging portions 240 of the groove shape when the mounting bracket 200 is mounted on the mounting portion 110.

In this way, since the hanging portions 240 are formed the groove shape at both side of the mounting bracket 200 and the corresponding portions 113 of the mounting portion 110 are formed of the hook shape extended to the both sides of the mounting bracket 200 and formed at the extended end portions, the corresponding portions 113 of the hook shape is engaged with the hanging portions 240 of the groove shape the mounting bracket 200 when the mounting bracket 200 is mounted on the mounting portion 110 so that the mounting bracket 200 can be fixed at the mounting portion 110. Herein, the corresponding portions 113 of the mounting portion 110 extend upwardly to be deformable, so that the corresponding portions 113 are deformed to be easily engaged with the hanging portions 240 of the mounting bracket 200 when the mounting bracket 200 is seated on the mounting portion 110.

The hook hanging structure described above between the hanging portions 240 of the mounting bracket 200 and the corresponding portions 113 of the mounting portion 110 may be selectively applied.

Figure 11:
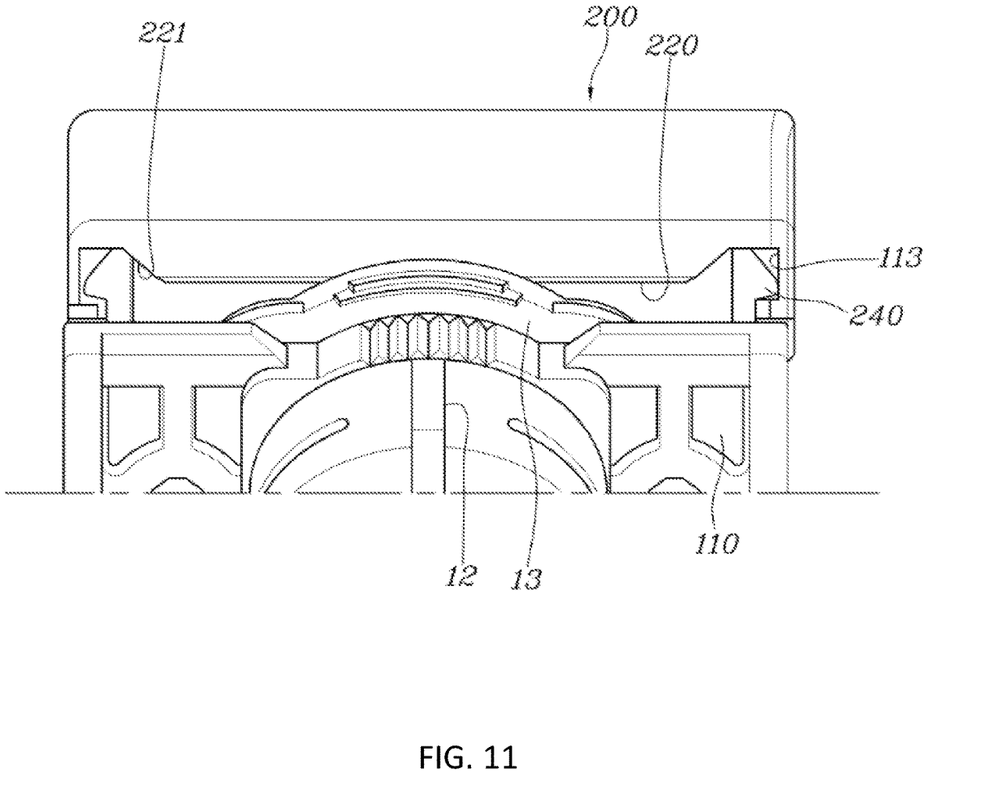

On the other hand, as shown in FIG. 11, the second end 200*b* of the mounting bracket 200 may be formed with a removal hole 221 extended upwardly from the insert groove 220 and opened to the hanging portions 240 and the corresponding portions 113 so that the hanging portions 240 and the corresponding portions 113 may be exposed to the outside of the mounting bracket 200.

The mounting bracket 200 may be secured to the mounting portion 110 each other by engaging the hanging portions 240 of the mounting bracket 200 and the corresponding portions 113 of the mounting portion 110 when mounted on the mounting portion 110. When the shift cable 10 needs to be repaired, the mounting bracket 200 should be removable from the mounting portion 110. For this, the hanging portions 240 and the corresponding portions 113 are exposed to the second end 200*b* of the mounting bracket 200 by forming the removal hole 221 at the second end 200*b* of the mounting bracket 200 so that the engagement of the hanging portions 240 and the corresponding portions 113 can be disassembled using a tool. Since the removal hole 221 is formed to extend from the insert groove 220 into which the socket 12 of the shift cable 10 is inserted at the second end 200*b* of the mounting bracket 200, the removal hole 221 cannot be easily found, unless a professional operator, and the work for inserting a tool into the removal hole 221 is difficult by disassembling the console only.

Thus, the removal hole 221 is formed at the second end 200*b* of the mounting bracket 200 so that a tool can be inserted to the hanging portions 240 and the corresponding portions 113 through the removal hole 221 and the mounting bracket 200 can be removed by releasing the engagement of the hanging portions 240 and the corresponding portions 113.

On the other hand, as shown in FIG. 1, the lever plate 21 to which the shift lever 20 and the shift cable 10 are connected is rotatably installed in the shift lever case 100 and an opened hole 114 communicated to the lever plate 21 may be formed on the outer side of the shift lever case 100. The opened hole 114 may be positioned to engage with the lever plate 21 with the shift lever 20 positioned at the neutral stage so that the position of the shift lever 20 can be fixed to the neutral stage when the fixing pins 230 of the mounting bracket 200 are inserted into the opened hole 114.

When connecting the shift cable 10 to the shift lever 20, the shift cable 10 is connected to the shift lever 20 with the position of shift lever 20 fixed at the neutral position. At this time, the position of the lever plate 21 is fixed by using a separate pin of an "'U"-shape and the separate pin of the "U"-shape is removed when the connecting work of the shift cable 10 is completed. However, when the separate pin is provided, there is a problem that the manufacturing cost is increased unnecessarily because of the loss of the pin.

In the present disclosure, it is possible to fix the position of the shift lever 20 at the neutral stage by using the fixing pins 230 of the mounting bracket 200. When inserting the fixing pins 230 of the mounting bracket 200 into the opened hole 114 of the shift lever case 100, the fixing pins 230 are engaged with the lever plate 21 so that the position of the shift lever 20 can be fixed with the position of the lever plate 21. For this, a hole matching the opened hole 114 may be formed in the lever plate 21 in a state where the shift lever 20 is positioned at the neutral stage, and the hole of the lever plate 21 and the opened hole 114 may be formed in a plurality of numbers so that the fixing pins 230 can be inserted.

Thus, with the shift lever 20 in a fixed position, by connecting the shift cable 10 to the lever plate 21, removing the mounting bracket 200 from the opened hole 114 of the shift lever case 100 and then engaging with the mounting portion 110, it is possible to prevent the shift cable 10 from being stolen.

In this way, with only the mounting bracket 200, the position of the shift lever 20 can be fixed when connecting the shift lever 20 to the shift cable 10 and after the above operation is completed, the mounting bracket 200 is mounted on the mounting portion 110 to prevent the shift cable 10 from being detached, so that it is able to prevent theft by the forced operation of the shift cable 10.

According to the anti-theft apparatus of the shift lever for the vehicle configured with the above described structure, the shift cable 10 connected to the shift lever 20 is prevented from being detached from the shift lever 20, thereby preventing the shift cable 10 from being detached and then forcibly operated. As a result, the shift stage of the vehicle is maintained at parking stage not to forcibly move the vehicle, thereby preventing theft of the vehicle.

Although specific embodiments of the present disclosure has been described and illustrated, those skilled in the art will appreciate that various alternations and modifications are possible without departing from the technical spirit of the present disclosure as disclosed in the appended claims.

What is claimed is:

1. An anti-theft apparatus of a shift lever for a vehicle, comprising:
    a shift lever case having:
        a shift lever which is connected with a shift cable; and
        a mounting portion fixing a socket of the shift cable; and
    a mounting bracket which is detachably connected to the mounting portion to cover an inner part of the mounting portion when the mounting bracket is mounted to the mounting portion,
    wherein the mounting bracket includes:
        a first end portion having a penetration hole through which the shift cable passes when the mounting bracket is mounted to the mounting portion;
        a second end portion having an insert groove configured to accommodate a body portion of the socket when the mounting bracket is mounted to the mounting portion; and
        fixing pins extending from an inner upper surface of the mounting bracket straight downwards around the shift cable such that the shift cable extends between the fixing pins limiting a lateral movement of the shift cable, and
    wherein the body portion of the socket further includes a support portion extended inward from an end of the socket, and the support portion is partially disposed in the insert groove of the mounting bracket, thereby preventing the socket from being released from the mounting bracket without detaching the mounting bracket from the mounting portion of the shift lever case.

2. The anti-theft apparatus of claim 1, wherein the mounting bracket comprises:
    the first end portion of which a lower end portion has a groove toward an upper side for the penetration hole through which the shift cable passes;
    a second end portion of which a lower end portion has the insert groove into which the support portion of the socket of the shift cable is partially disposed;
    a side portion connecting both end portions of the first end portion and the second end portion; and
    an upper end portion closing an upper side of the mounting bracket so that the lower end portion of the mounting bracket is opened in a box shape.

3. The anti-theft apparatus of claim 1, wherein the penetration hole of the mounting bracket has a diameter larger than that of the shift cable, and
    wherein the penetration hole has a height longer than a height at which the shift cable moves in an up-down direction when the shift lever moves to forwards or rewards.

4. The anti-theft apparatus of claim 1, wherein the mounting portion has an engaging portion which is grooved in which the socket of the shift cable is seated, and
    wherein the socket of the shift cable further comprises an extension portion extending from the support portion of the body portion to one side such that the shift cable penetrates into the extension portion.

5. The anti-theft apparatus of claim 1,
    wherein the fixing pins are spaced from each other so that the shift cable is disposed in a separated space between the fixing pins.

6. The anti-theft apparatus of claim 5, wherein the mounting portion has a plurality of fixing holes into which the plurality of fixing pins extend, and
    wherein the fixing holes are arranged at both sides of the shift cable with the socket of the shift cable that is fixed to the mounting portion.

7. The anti-theft apparatus of claim 6, wherein a spacing distance between the fixing pins and a spacing distance between the fixing holes are equal, and
    wherein the spacing distances of the fixing pins and the fixing holes are larger than a diameter of the shift cable.

8. The anti-theft apparatus of claim 1, wherein the mounting bracket includes first hanging portions each of which having a hook or groove shape on both sides of the mounting bracket and the mounting portion has second hanging portions each of which having a hook or groove shape corresponding to the first hanging portions, so that the mounting bracket is fixed at the mounting portion by the first and second hanging portions engaged with each other when the mounting bracket is mounted on the mounting portion.

9. The anti-theft apparatus of claim 8, wherein each of the first hanging portions has the hook shape at both sides of the mounting bracket, and wherein each of the second hanging portions has the groove shape at the mounting portion and extends to the mounting bracket so that the first hanging portions are inserted into the second hanging portions, respectively.

10. The anti-theft apparatus of claim 8, wherein the first hanging portions have the groove shape at both sides of the mounting bracket, and wherein the second hanging portions have the hook shape extending upwardly from the mounting portion and inserted into and engaged with the first hanging portions, respectively, when the mounting bracket is mounted on the mounting portion.

11. The anti-theft apparatus of claim 8, wherein the mounting bracket further includes a removal hole extending upwardly from the insert groove and opened to the first and second hanging portions, so that the first and second hanging portions are exposed to an outside of the mounting bracket.

12. The anti-theft apparatus of claim 1, wherein the shift lever case has:

a lever plate, to which the shift lever and the shift cable are connected, rotatably disposed in the shift lever case; and an opened hole communicating with the lever plate on an outer side of the shift lever case, wherein the opened hole is positioned to engage the lever plate with the shift lever at a neutral stage, so that a position of the shift lever is fixed to the neutral stage when the fixing pins of the mounting bracket are inserted into the opened hole.

* * * * *